3,238,269
HYDROGENATION PROCESS
Peter Desmond Holmes and Kenneth Hugh Bourne, Sunbury-on-Thames, England, assignors to The British Petroleum Company Limited, London, England, a British joint-stock corporation
No Drawing. Filed Dec. 14, 1962, Ser. No. 244,590
Claims priority, application Great Britain, Dec. 18, 1961, 45,236/61
7 Claims. (Cl. 260—677)

This invention relates to a process for the hydrogenation of a feedstock containing a minor proportion of a sulphur containing compound.

It has been disclosed that certain unsaturated feedstocks may be hydrogenated over a supported catalyst containing nickel which, under the operating conditions, is present in major proportion as elemental nickel. However we have found that, in general, when the feedstock contains sulphur in combined form, the activity of the catalyst declines. The extent of the decline in activity of the catalyst is dependent primarily on two factors, that is, (a) the type of sulphur-containing compound present in the feed and (b) the amount of sulphur-containing compound which is passed over the catalyst.

The decline in activity of the catalyst may be compensated by progressively increasing the temperature of the hydrogenation treatment during the effective life of the catalyst.

We have also found that when using a feedstock consisting of a mixture of hydrogenatable compounds together with a minor proportion of a sulphur containing compound, a catalyst as hereinbefore described may, after an initial decline in activity, develop selectivity for the hydrogenation of a more readily hydrogenatable component of the feedstock with no or little hydrogenation of a less readily hydrogenatable component thereof.

Whether or not this selectivity is developed, is dependent, we have found, on the type of sulphur-containing compound present in the feedstock. For the purpose of the present specification we classify sulphur-containing compounds as follows:

Class A.—Thiophenes, thiacycloalkanes and dialkylmonosulphides.

Class B.—Sulphur containing organic compounds not included in class A (for example mercaptans and dialkyl disulphides, elemental sulphur, hydrogen sulphide and carbon disulphide).

We have found that, in general, sulphur-containing compounds of class A promote selectivity in the catalyst and sulphur-containing compounds of class B do not.

According to one aspect of the present invention there is provided a process for the selective hydrogenation of a more readily hydrogenatable compound when present in a mixture containing, also, a less readily hydrogenatable compound and a minor proportion of one or more sulphur-containing compounds of class B; which comprising adding to said mixture one or more sulphur-containing compounds of class A and continuously passing the blend with hydrogen over a supported elemental nickel catalyst under hydrogenating conditions.

According to another aspect of this invention there is provided a process for the selective hyrdogenation of a more readily hydrogenatable compound when present in a mixture containing, also, a less readily hydrogenatable compound and a minor proportion of one or more sulphur-containing compounds of class B; which comprises continuously passing said mixture with hydrogen over a supported elemental nickel catalyst under hydrogenating conditions while periodically introducing into the mixture one or more sulphur-containing compounds of class A.

If desired, class A sulphur-containing compound may be recovered from the hydrogenation product and recycled.

Preferably the class A sulphur-containing compound is selected to have distillation characteristics such that it is readily recovered from the hydrogenation product by distillation.

The preparation of the catalyst and its activation may be carried out in any convenient manner, the following three methods being merely illustrative.

(a) The catalyst may be prepared on the base by an impregnation technique by dissolving in water a nickel salt, for example, nickel nitrate, and impregnating the support material with it. The support material may be conveniently in the form of granules or pellets of any desired size formed from ground support material. After impregnation, the catalyst is dried and is then in a form in which it can be stored for long periods without deterioration. In order to use the catalyst, it must be activated by heating to decompose the salt; in the case of the nitrate this requires a temperature of about 500–550° C., and the nickel will be converted to the oxide. Final activation by reduction to metallic nickel can be carried out in a stream of hydrogen or hydrogen-containing gas at a temperature of 150° to 600° C. and at a pressure of 0–200 lbs./sq. in. gauge. The time of treatment depends upon the temperature. Typical conditions using a sepiolite catalyst support are 16 hours at 500° C. and atmospheric pressure; no damage results to the sepiolite however, if it is heated at a temperature above 600° C.

(b) The catalyst may be prepared by milling dry nickel formate with powdered catalyst support, and the mixture subsequently pelleted. The advantage of this method of preparation is that a salt such as nickel formate reduces directly to nickel (without going through the oxide state) in a non-oxidising atmosphere, for example in an inert gas or hydrogen stream at a temperature of 150° C. to 300° C. At 250° C. treatment for 4 hours will usually be appropriate. This method has the advantage that it is not necessary to heat large quantities of catalysts to temperatures of 500° C. and higher.

(c) The catalyst may be prepared by a technique which utilises the water soluble complex formed when nickel formate dissolves in ammonia. This complex breaks down on heating to give nickel formate again. By using this water-soluble complex, catalysts may be prepared by the impregnation technique from normally water insoluble compounds such as nickel formate dissolved in ammonia solution, and the solution used for the impregnation of granules or pellets of the support material. The catalyst is then dried, and activation is carried out by the method described under (b).

After the reduction, the nickel catalyst should not be allowed to come into contact with air or spontaneous oxidation of the nickel to nickel oxide may occur.

Preferably the activated catalyst contains 2 to 20% by wt. of elemental nickel, based on the total weight of catalyst.

Suitable catalysts for treatment with a sulphur-containing material and use in the process of the invention are nickel supported on alumina, kieselguhr, chalk and silica gel.

A preferred catalyst is nickel-on-sepiolite.

Sepiolite is a commercially available clay mineral, which occurs naturally and which can also be prepared synthetically. It has the ideal formula $$H_4Mg_9Si_{12}O_{30}(OH)_{10} \cdot 6H_2O$$

and is also known as Meerschaum. Further information on sepiolite and its properties may be found in "Chemistry and Industry" of November 16, 1957, at pages 1492 to 1495.

Sepiolite possesses an advantage over some other bases, for example, alumina, in that there is no reaction of the nickel salt with sepiolite during the heating of the catalyst to convert the nickel salt to oxide, and the final reduction can be carried out at a lower temperature than that necessary for nickel-alumina catalysts.

A preferred class of organic sulphur compounds for use in the treatment of the catalyst consists of the thiophenes.

Usually the treatment of the catalyst to cause sulphiding will be carried out at a temperature from 0–200° C. and at any convenient pressure, being sub-atmospheric, atmospheric or super-atmospheric.

If desired the treatment of the catalyst may be carried out in the presence of hydrogen.

Usually the amount of the sulphur-containing material which is reacted with the catalyst will be such that it contains 1 to 40 mol percent of sulphur, based on the elemental nickel content of the untreated catalyst.

Hydrogenation in accordance with the present invention may be carried out using as feedstock a mixture of compounds containing carbon which are capable of hydrogenation. Thus the compounds may be selected from carbon monoxide, an unsaturated hydrocarbon, for example an olefin, and compounds containing carbon, hydrogen and oxygen, for example, an aldehyde or ketone.

The olefin may be a mono-olefin, di-olefin or other polyolefin; however, the preferred feedstocks are mono-olefins. Preferably the olefin has 4–6 carbon atoms/molecule.

Preferably hydrogenation is carried out at a temperature in the range 50–250° C. at any pressure being sub-atmospheric, atmospheric or super-atmospheric. Usually it will be desirable to maintain liquid phase conditions and the pressure will be elected accordingly.

If desired hydrogenation may be carried out using a gas consisting of hydrogen together with inert constituents. Preferably, when inert constituents are present, the gas contains at least 25 mol percent of hydrogen, the proportion suitably lying within the range 25–90 mol percent of hydrogen.

A preferred gas is a platformer tail gas. Suitably a gas is employed containing 70 mol percent of hydrogen. A typical gas will consist of 70 mol percent of hydrogen and 30 mol percent of methane. Other suitable gases are steam cracker tail gas, catalytic cracker tail gas and tail gas derived from the dehydrogenation of hydrocarbons.

The process of the invention may also be employed for the selective hydrogenation of acetylenes and/or dienes in mixtures of carbon monoxide, hydrogen and dienes, either in the presence or absence of other hydrocarbons. In this case, the feedstock may be passed over the catalyst without the addition of extraneous hydrogen.

This invention is illustrated but not limited with reference to the following examples.

*Example 1*

A catalytic material consisting of nickel-on-sepiolite was prepared by impregnating granular sepiolite with an ammoniacal solution of nickel formate. After drying, the catalyst contained 9.95 percent weight nickel (based on the material stable at 1020° F.).

Samples of catalyst were activated by heating to 250° C. in a stream of hydrogen (1000 vol./vol./hr.) at atmospheric pressure and maintaining this treatment for 4 hours. The activated catalyst was then cooled in hydrogen to the required temperature.

A feedstock of the composition:

| | |
|---|---|
| Isoprene, percent by vol. | 10 |
| Normal heptane, percent by vol. | 90 |
| Normal butylmercaptan, gms/100 ml. feed | 0.05 | was passed over the catalyst at a pressure of 200 lbs./sq. in. gauge; a space velocity of 2 vol./vol./hour and a reaction temperature of 100° C. together with hydrogen at a rate of 4 mls. of hydrogen per mol of isoprene.

After 19½ hours on stream the feedstock was changed to use the same hydrocarbon mixture but in the absence of sulphur. After a further 5½ hours on stream the feed was changed to use the same hydrocarbon mixture with 0.05% by vol. of thiophene. After a further 11½ hours on stream the feed was changed to revert to the hydrocarbon mixture containing normal butyl mercaptan which was used initially.

Results obtained were as shown in Table 1.

"Selectivity" is defined as the ratio of percentage by wt. of $C_5$ mono-olefin in the product to percentage by wt. of $C_5$ paraffins in the product.

"Activity" is defined as the sum of the percentages by wt. of $C_5$ mono-olefins and $C_5$ paraffins in the product.

TABLE 1

| Hours on stream | Feed S content | Sample time (hrs.) | $C_5$ product composition (percent wt.) | | | Selectivity | Activity |
|---|---|---|---|---|---|---|---|
| | | | Paraffin | monoolefin | Unconverted diene | | |
| 0.19½ | 0.05 grams n-BuSH per 100 ml. feed. | 3–4 | 99 | 1 | Nil | 0.01 | 100 |
| | | 12½–13 | 75 | 8 | 17 | 0.11 | 83 |
| | | 19–19½ | 58 | 21 | 21 | 0.36 | 79 |
| 19½–25 | Nil | 22–22½ | 57 | 27 | 16 | 0.47 | 84 |
| 25–36½ | 0.05% vol. thiophene | 31–31½ | 11 | 82 | 7 | 7.5 | 93 |
| | | 36–36½ | 4 | 87 | 9 | 22 | 91 |
| 36½–41½ | 0.05 grams n-BuSH per 100 ml. feed. | 41–41½ | 1 | 50 | 50 | 50 | 50 |

*Example 2*

The catalyst employed was prepared as described in Example 1.

The feedstock consisted of a mixture of the composition:

| | |
|---|---|
| Isoprene, percent by vol. | 10 |
| Iso-hexenes, percent by vol. | 10 |
| Normal heptane, percent by vol. | 80 |
| Normal butyl mercaptan, grams per 100 ml. of feed | 0.2 |

This mixture was passed over the freshly activated catalyst at a pressure of 100 lbs./sq. in. gauge, a space velocity of 2 vol./vol./hour, a temperature in the range 100–130° C. and with 4 mol of hydrogen per mol of unsaturated hydrocarbon.

Initially all of the isoprene and $C_6$ olefin were hydrogenated to paraffins. As treatment with the mercaptan-containing feed continued, activity began to fall off but little or no selectivity for monoolefins was obtained. Addition of the thiophene greatly increased the selectivity (the $C_6$ olefins were not hydrogenated and the isoprene was hydrogenated only to monoolefins). During this period of thiophene addition, activity continued to decline as a result of the mercaptan sulphur compounds, so that in the final part of the run temperature had to be raised to maintain the activity. Selectivity remained high after removal of the thiophene sulphur from the feedstock.

Results obtained were as shown in Table 2.

"Selectivity" is defined as the ratio of the percentage by weight of methylbutenes in the product to the percentage by weight of isopentanes in the product.

"Activity" is defined as the sum of the percentages by weight of methylbutenes and isopentanes in the product.

TABLE 2

| Hours on stream | Feed S content | Sample time (hr.) | Catalyst temp., °C. | $C_6$ product composition | | $C_5$ product composition | | | Selectivity | Activity |
|---|---|---|---|---|---|---|---|---|---|---|
| | | | | Paraffins | Monoolefins | Paraffins | Monoolefins | Dienes | | |
| 0–6½ | 0.2 grams n-BuSH per 100 ml. | ½–1 | 100 | 100 | Nil | 100 | Nil | Nil | 0 | 100 |
| | | 2½–3 | | 80 | 20 | 88 | Trace | 12 | 0 | 100 |
| | | 4½–5 | | 73 | 27 | 84 | 6 | 10 | 0.07 | 90 |
| | | 6–6½ | | 69 | 31 | 84 | 4 | 12 | 0.05 | 88 |
| | | 7–7½ | | 63 | 37 | 69 | 16 | 15 | 0.23 | 85 |
| 6½–10 | 0.2 grams per 100 ml. plus 0.5 grams Thiophene per 100 ml. | 7½–8 | 100 | 45 | 55 | 51 | 24 | 25 | 0.47 | 75 |
| | | 8–8½ | | 13 | 87 | 15 | 37 | 48 | 2.5 | 52 |
| | | 8½–9 | | 3 | 97 | 4 | 41 | 55 | 10 | 45 |
| | | 9–9½ | | <1 | >99 | 3 | 45 | 52 | 15 | 48 |
| | | 9½–10 | | | 100 | <1 | 28 | 72 | >50 | 28 |
| 10–15½ | 0.2 grams per 100 ml. | 10½–11 | 120 | | 100 | 1 | 40 | 59 | >50 | 41 |
| | | 12½–13 | 130 | | 100 | 1 | 38 | 61 | 30 | 39 |
| | | | 130 | <1 | >99 | 1 | 23 | 76 | 25 | 24 |

We claim:

1. In a process for the selective hydrogenation of dienes and acetylenes in a feedstock mixture containing said dienes and acetylenes, less readily hydrogenatable compounds selected from the group consisting of monoolefins, and at least one sulphur-containing hydrocarbon other than sulphur-containing hydrocarbons selected from the group consisting of thiophenes, thiacycloalkanes having at least 4 carbon atoms in the ring and dialkyl-monosulphides, said process comprising: adding to said mixture at least one sulhpur-containing hydrocarbon selected from the group consisting of thiophenes, thiacycloalkanes having at least 4 carbon atoms in the ring and dialkyl-monosulphides; and continuously passing the blend of said mixture and said added sulphur-containing hydrocarbon with hydrogen over a supported elemental nickel catalyst under hydrogenating conditions at a hydrogenating temperature of from 50 to 250° C.

2. In a process according to claim 1, in which said added sulphur-containing hydrocarbon is recovered from the product and recycled for use in admixtures with the feedstock mixture.

3. In a process according to claim 1, in which the nickel catalyst is supported on sepiolite.

4. In a process according to claim 1, in which the sulphur-containing hydrocarbons of said feedstock mixture are mercaptans.

5. In a process for the selective hydrogenation of dienes and acetylenes in a feedstock mixture containing said dienes and acetylenes, less readily hydrogenatable compounds selected from the group consisting of monoolefins, and at least one sulphur-containing hydrocarbon other than sulphur-containing hydrocarbons selected from the group consisting of thiophenes, thiacycloalkanes having at least 4 carbon atoms in the ring and dialkylmonosulphides, said process comprising: continuously passing said mixture with hydrogen over a supported elemental nickel catalyst under hydrogenating conditions at a hydrogenating temperature of from 50 to 250° C. and periodically introducing into said mixture at least one sulphur-containing hydrocarbon selected from the group consisting of thiophenes, thiacycloalkanes having at least 4 carbon atoms in the ring and dialkyl-monosulphides 6. In a process according to claim 5, in which said added sulphur-containing hydrocarbon is recovered from the product and recycled for use in admixtures with the feedstock mixture.

7. In a process according to claim 5, in which the sulphur-containing hydrocarbons of said feedstock mixture are mercaptans.

References Cited by the Examiner
UNITED STATES PATENTS 3,004,914  10/1961  White _____ 260—677
3,041,385  6/1962  Bourne et al. _____ 260—677
3,075,024  1/1963  Frevel et al. _____ 260—677

ALPHONSO D. SULLIVAN, *Primary Examiner.*

D. S. ABRAMS, *Assistant Examiner.*